(12) United States Patent
Kumar et al.

(10) Patent No.: US 8,504,006 B2
(45) Date of Patent: Aug. 6, 2013

(54) INTERACTIVE MANAGEMENT OF WIRELESS WAN (WWAN) MOBILE DEVICES

(75) Inventors: Chandra Kumar, Karnataka (IN); Chandrika Krishnamurthy, Bangalore (IN); Praveen Prabhakara, Bangalore (IN)

(73) Assignee: Symbol Technologies, Inc., Holtsville, NY (US)

( * ) Notice: Subject to any disclaimer, the term of this patent is extended or adjusted under 35 U.S.C. 154(b) by 791 days.

(21) Appl. No.: 12/346,292

(22) Filed: Dec. 30, 2008

(65) Prior Publication Data

US 2010/0167733 A1    Jul. 1, 2010

(51) Int. Cl.
*H04M 3/00*    (2006.01)

(52) U.S. Cl.
USPC ....... 455/419; 455/92; 455/422.1; 455/432.1; 370/328; 370/338

(58) Field of Classification Search
USPC ............... 455/67.1, 92, 310, 403, 419, 422.1, 455/423, 429, 432.1, 461, 522, 524, 560, 455/531, 436–445; 370/328–338
See application file for complete search history.

(56) References Cited

U.S. PATENT DOCUMENTS

| | | | |
|---|---|---|---|
| 7,415,438 B1 | 8/2008 | Berman et al. | |
| 7,424,099 B2 | 9/2008 | Roberts et al. | |
| 2001/0030950 A1* | 10/2001 | Chen et al. | 370/329 |
| 2001/0037223 A1* | 11/2001 | Beery et al. | 705/4 |
| 2002/0174335 A1* | 11/2002 | Zhang et al. | 713/168 |
| 2003/0063717 A1* | 4/2003 | Holmes | 379/88.04 |
| 2004/0003046 A1* | 1/2004 | Grabelsky et al. | 709/206 |
| 2004/0033815 A1* | 2/2004 | Noldus et al. | 455/560 |
| 2005/0090248 A1* | 4/2005 | Shen et al. | 455/432.1 |
| 2005/0210525 A1* | 9/2005 | Carle et al. | 725/105 |
| 2007/0150732 A1* | 6/2007 | Suzuki et al. | 713/168 |
| 2008/0032692 A1* | 2/2008 | Ossa | 455/435.1 |
| 2008/0062937 A1* | 3/2008 | Mansfield et al. | 370/338 |
| 2009/0198802 A1* | 8/2009 | Tanner et al. | 709/221 |

* cited by examiner

*Primary Examiner* — Kamran Afshar
*Assistant Examiner* — Marisol Fahnert

(57) ABSTRACT

A system and methods for allowing an enterprise management system to provision and configure a WWAN communication device on a managed network without incurring the tedious task of manually entering all the configuration information for every WWAN communication device on the enterprise management system. A dedicated communication link is provided with a standard communication protocol so each WWAN device can communicate with a carrier server and have the carrier server acts as a validation point and communication bridge to the enterprise management server until the WWAN communication device is configured for management by the enterprise management server.

16 Claims, 8 Drawing Sheets

INTERACTIVE MANAGEMENT OF WIRELESS WAN (WWAN) MOBILE DEVICES

TECHNICAL FIELD

The subject invention relates generally to device management systems, and more particularly to interactively managing wireless WAN mobile devices through a telephone system implementing voice recognition.

BACKGROUND

As the utility of mobile devices has increased, carriers have deployed large numbers of mobile devices to meet the needs of their customers. The first step in managing these mobile devices is the discovery of the mobile device by the Enterprise Management System, meaning the enterprise management server must recognize the mobile device. Current technology requires manual entry of information about each mobile device into a database before the enterprise server can recognize the device. Information required by the database includes the mobile device serial number or identification number, details of communication requirements with the carrier, etc.

After the manual entry of the identification information and communication parameters into the Enterprise server database, the Enterprise Management System can connect to the device and complete the device configuration. Although this process works for smaller numbers of mobile devices, it does not scale well and becomes unwieldy for large numbers of mobile devices. Another shortcoming is the labor requirements to enter the data, resolution of the data entry mistakes, and the time consuming nature of the operation.

Further, users desire the ability to obtain a new mobile device and add the mobile device to the network at a time of their choosing. The users do not want the requirement of bringing the mobile device to a location where the appropriate enterprise management service person can inspect the mobile device for the necessary information to enter into the database and satisfy the enterprise management system that the device is valid for entry on the network.

Accordingly, deficiencies in existing device management systems, desired cost savings of support and expected productivity improvements of users have created market demand for a device management system that allows the user to provide the information necessary to allow the enterprise management server to recognize a new device desiring access to the network. An automated system is desirable, allowing the user to add a new mobile device without the constraints of the business hours of an office currently responsible for adding new mobile devices to the network.

SUMMARY

The following presents a simplified summary in order to provide a basic understanding of some of the aspects described herein. This summary neither is an extensive overview nor intended to identify key or critical elements or to delineate the scope of the various aspects described herein. The sole purpose of the summary is to present some concepts in a simplified form as a prelude to the more detailed description presented later.

The disclosure describes systems and methods for automating the initialization and configuration of a mobile device on a wireless wide area network (WWAN). The user can place a call to a carrier server and if requested, provide authentication information. After the optional authentication, the carrier server presents the user with an interactive system for provisioning the mobile device. The interactive system is operational by keypad entry or by voice command. After the user selects the desired options, the carrier server forwards the user's requests to the enterprise management server for further processing. The enterprise management server validates the mobile device identification number and once validated, configures the mobile device and allows the mobile device on the network.

Further, the interactive system allows the user to upgrade the operating system or application components of the mobile device without the requirement of bringing the mobile device to a service location for upgrade by technical personnel. The enterprise management server requires only knowledge of the carrier server configuration to establish communications between the two servers and the mobile devices are preconfigured with the standard configuration of the carriers dialup provisioning line.

To the accomplishment of the foregoing and related ends, certain illustrative aspects are described herein in connection with the following description and the annexed drawings. These aspects are indicative of various ways to practice the invention, all of which are intended to be covered herein. Other advantages and novel features may become apparent from the following detailed description when considered in conjunction with the drawings.

DETAILED DESCRIPTION

Figure 1:
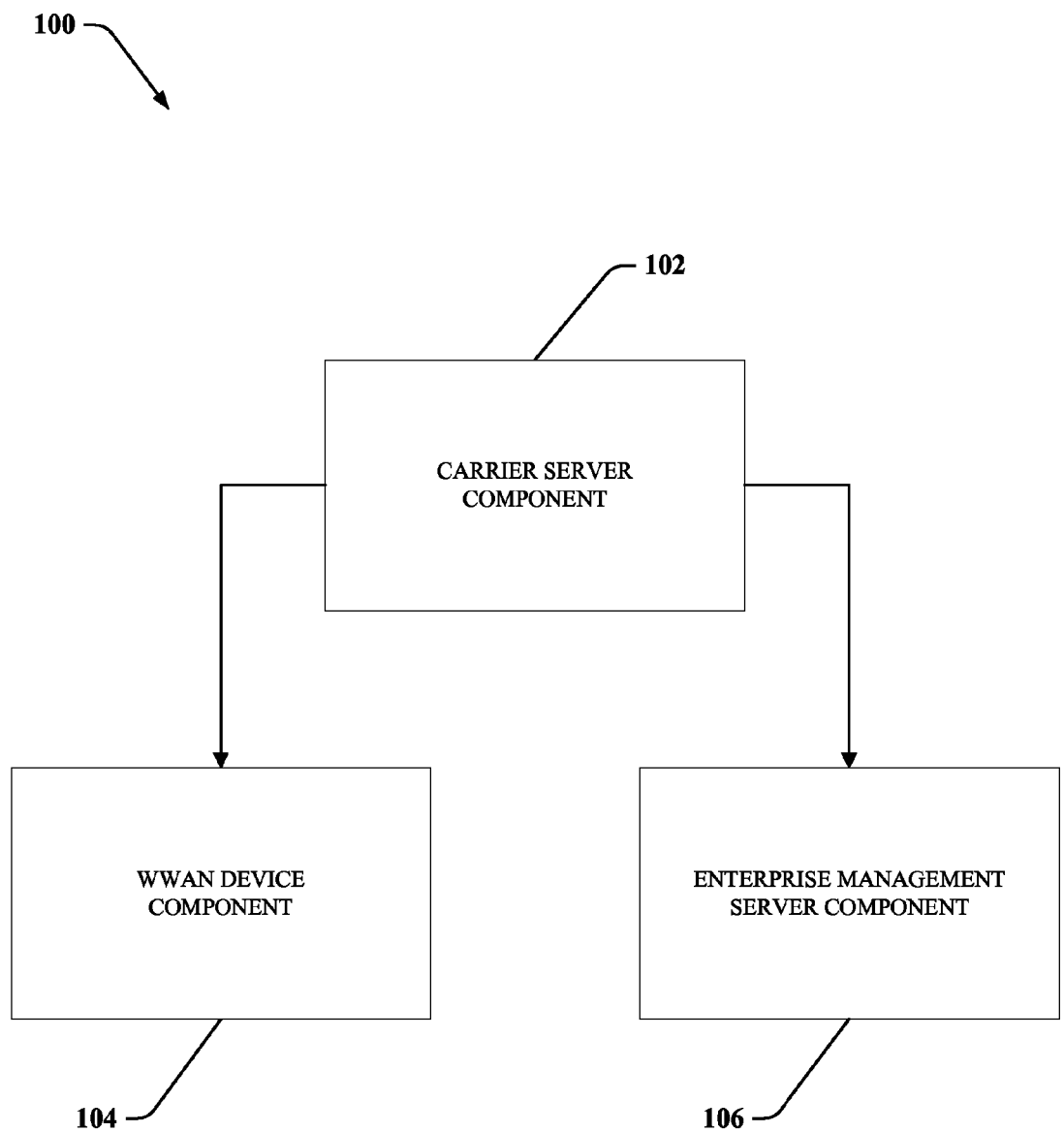
FIG. 1 illustrates an embodiment of an interactive WWAN management system.

Various embodiments are now described with reference to the drawings. In the following description, for purposes of explanation, numerous specific details are set forth in order to provide a thorough understanding of one or more embodiments. It may be evident, however, that the various embodiments can be practiced without these specific details. In other instances, well-known structures and devices are shown in block diagram form in order to facilitate describing these embodiments.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers.

The word "exemplary" as used herein means serving as an example, instance, or illustration. Any aspect or design described herein as "exemplary" is not necessarily to be construed as preferred or advantageous over other aspects or designs.

Furthermore, the one or more embodiments can be implemented as a method, apparatus, or article of manufacture using standard programming and/or engineering techniques to produce software, firmware, hardware, or any combination thereof to control a computer to implement the disclosed embodiments. The term "article of manufacture" (or alternatively, "computer program product") as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that computer communication media includes a carrier wave that can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope of the disclosed embodiments.

Various embodiments are presented in terms of systems that can include a number of components, modules, and the like. It is to be understood and appreciated that the various systems can include additional components, modules, etc. and/or cannot include all of the components, modules, etc. discussed in connection with the figures. A combination of these approaches may also be used.

FIG. 1 is a block diagram overview of the interactive management of WWAN mobile device system 100. The interactive management of WWAN mobile device system 100 comprises a carrier server component 102, a WWAN mobile device component 104 and an enterprise management server component 106. The carrier server component 102 provides a telephone number for the WWAN device component 104 to call for provisioning and configuration. The telephone number can be a toll free number to increase customer satisfaction. The user can call the telephone number with the WWAN device component 104 at anytime day or night because of the automated nature of the system and the fact that service personnel are not required for system use.

In one aspect, the carrier server component 102 can require authentication information such as a username and a password. The authentication requirement can exist for all callers or for callers from specified or unknown numbers. For example, the carrier server component 102 can require authentication information from a new WWAN device component 104 requiring provisioning because the WWAN device component 104 is unknown to the carrier server component 102. On the other hand, a WWAN device component 104 already provisioned and recognized by the carrier server component 102 can access the system for configuration changes and updates without the requirement of providing authentication information.

Further, the carrier server component 102 operates as a bridge between the WWAN device component 104 and enterprise management server component 106 until the WWAN device component 104 is configured and managed. The carrier server component 102 forwards options selected by the WWAN device component 104 to enterprise management server component 106. After processing the option request, enterprise management server component 106 sends the reply to the carrier server component 102 and the carrier server component 102 forwards the reply to the WWAN device component 104. In another aspect of the carrier server component 102, the carrier server component 102 is an SMTP/SMPP server interacting with the WWAN device component 104 and the enterprise management server component 106.

WWAN device component 104 interacts with the carrier server component 102, providing authentication information if necessary and negotiating the interactive system in to select the desired provisioning or configuration. The user can use the keypad or a voice operated system to select the desired options for configuration of the WWAN device component 104. The WWAN device component also provides multiple language support and touch screens for use with the interactive system.

Enterprise management server component 106 provides the ability for the enterprise management server to communicate with the carrier server component 102 to detect and provision new devices or update the configuration of previously provisioned devices. Enterprise management server component 106 has knowledge of a minimal set of communication parameters for connectivity to the carrier server component 102. Enterprise management server component 106 does not require manual entry of pre-configuration data for the WWAN device component 104 because the carrier server component 102 acts as a bridge between the WWAN device component 104 and the enterprise management server component 106.

After notification by the carrier server component 102 that a WWAN device 104 requested provisioning or configuration, the enterprise management server component 106 determines the validity of the request by validation of a WWAN device serial number available to the enterprise management server component 106. After validating the serial number, the enterprise management server 106 sends configuration information for the WWAN device component 104 to the carrier server component 102 for forwarding to the WWAN device component 104. Once the WWAN device component 104 receives the configuration information the WWAN device component 104 configures itself and now is managed by the enterprise management server component 106.

Figure 2:
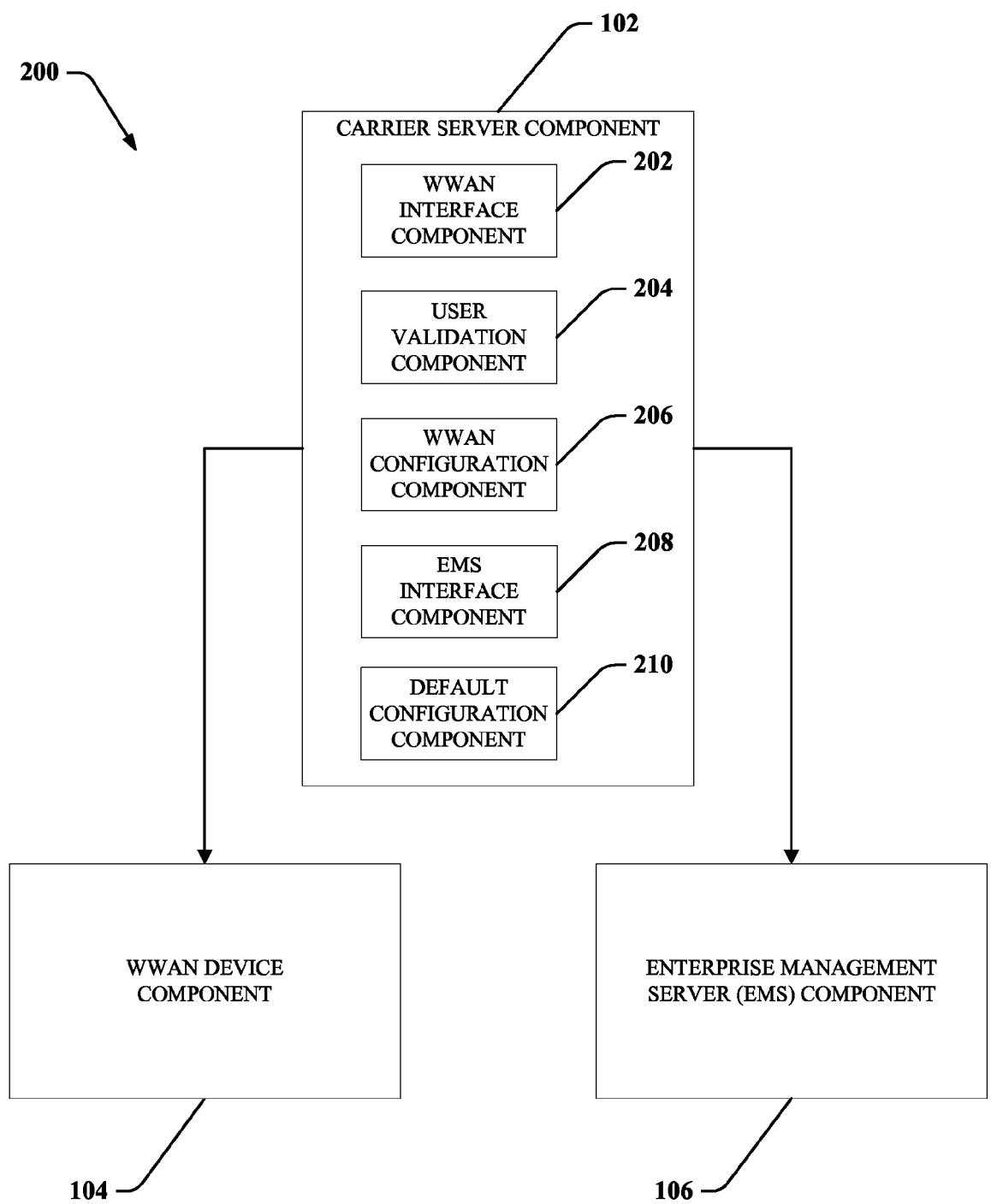
FIG. 2 illustrates an embodiment of an interactive WWAN management system and the associated carrier server components.

FIG. 2 depicts a carrier server component 102 comprising the WWAN interface component 202, the user validation component 204, the WWAN configuration component 206, the EMS interface component 208 and the default configuration component 210. The WWAN interface component 202 provides a simple interface of well-known communication parameters between the WWAN device component 104 and the carrier server component 102. The well-known parameters are configured in the WWAN device component 104 before delivery to the user and the carrier server component 102 has a dedicated communication link configured with these same parameters for use by the WWAN device component 104. Accordingly, initial configuration of these basic parameters before communication is not required.

User validation component 204 provides the optional ability for the carrier server component to require the entry of a valid username and password before the carrier server component 102 forwards the provisioning or configuration request to the enterprise management server component 106. The username and password can be a common username and password for all WWAN device components 104 requesting provisioning and/or configuration or the username and password can be unique for each WWAN device component 104.

In another aspect of the innovation, the input of the username and password to the user validation component 204 can be from the WWAN device component 104 keypad or it can be spoken commands to the communication link. Further, establishing the communication link can require the user to dial a toll free telephone number dedicated to provisioning and configuring WWAN devices. If user validation is required and the user cannot provide the required username and password then the carrier server component 102 declines the user's request for forwarding the provisioning or configuration requests to the enterprise management server component 106.

The WWAN configuration component 206 maintains the configuration parameters necessary for initial communicate with the WWAN device component. These communication parameters can be the same for all devices attempting to communicate with the carrier server component 102 or they can differ by device class. For example, one manufacturer's communication device configurations parameters can be the same for all their communication devices but different from another manufacturer's communication device parameters. In a similar fashion, one manufacturer's communication devices can require username and password validation while another manufacturer's devices are not required to provide a valid username and password.

The EMS interface component 208 provides the ability for communicatively connecting from the carrier server component 102 to the enterprise server component 106 with a mutually agreed upon set of communication parameters. The communication parameters are a minimal set of configuration parameters providing enough communications to validate the WWAN device and allow the enterprise management server component 106 to establish management of the WWAN device. The EMS interface component supports different sets of minimal communication parameters for different enterprise management server components 106 if desired.

Further, the use of the EMS interface device component 208 does not require extensive knowledge of the device type. The interface device component 208 acts as a bridge and handles the communications between the enterprise management server component 106 and the WWAN device component 104 until the enterprise management server component 106 is prepared to manage the WWAN device component 104. After the provisioning or configuration is complete, the EMS interface component is no longer required and returns to an idle state awaiting a request from the next WWAN device component desiring provisioning or configuration.

In another aspect, the default configuration component 210 archives the minimal set of communication parameters required to allow the carrier server component 102 to act as a bridge. When a WWAN device component 104 attempts to establish a communication link with the carrier server component 102, the carrier server component 102 extracts the minimal set of communication parameters from the default configuration component and established a communication link with the enterprise management server component 106.

The archived default communication parameters necessary for communication between the carrier server component 102 and the enterprise management server component 106 are mutually agree upon between the carrier server component 102 and the enterprise management server component 106 but can be mutually changed by both components as necessary. The default configuration component 210 can archive different sets of minimal communication parameters for selection by the enterprise management server component 106 or the carrier server component 102 based on the surrounding circumstances at the time of the connection.

Figure 3:
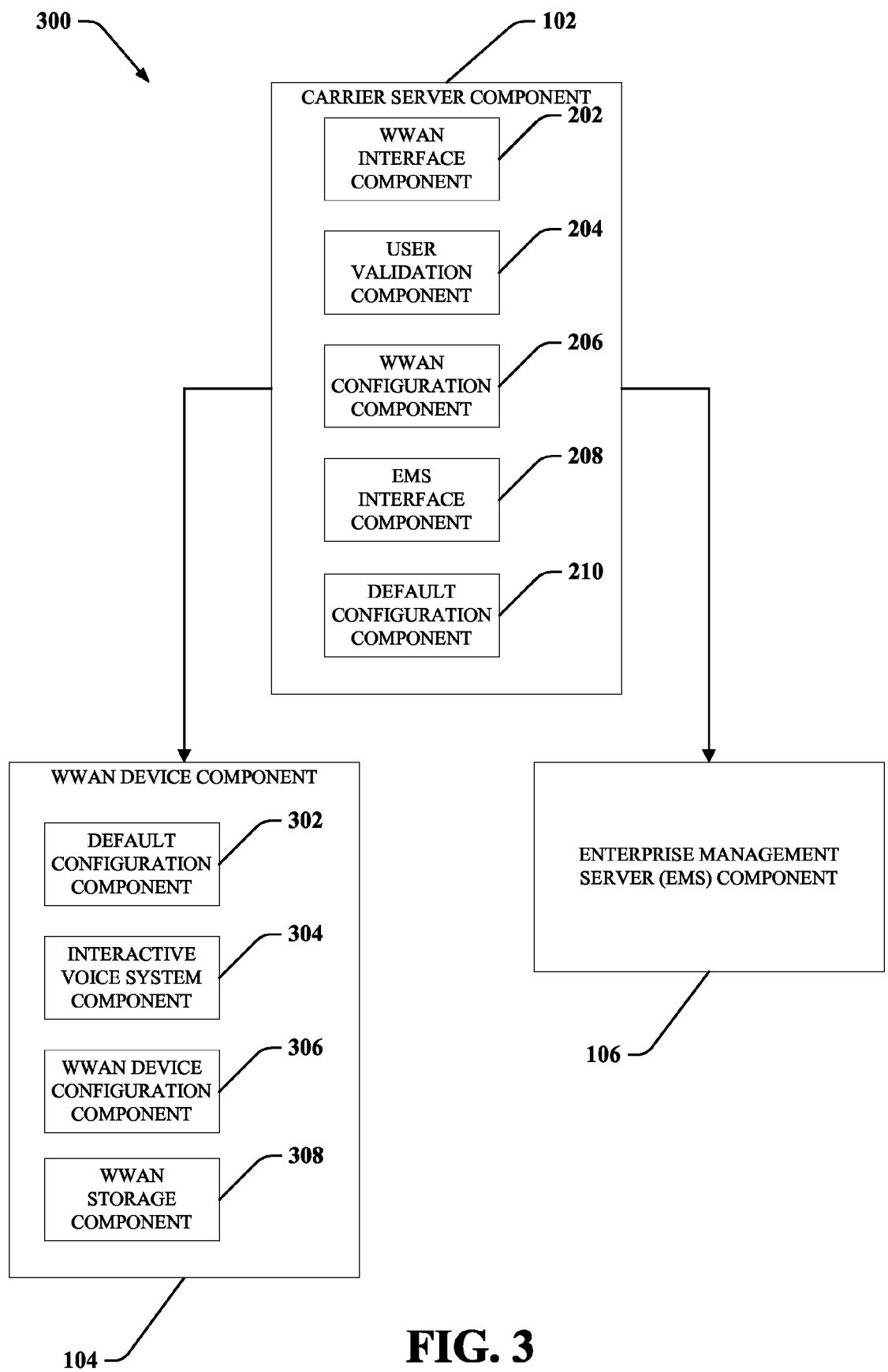
FIG. 3 illustrates an embodiment of an interactive WWAN management system and the associated WWAN device components.

FIG. 3 depicts a WWAN device component 104 comprising a default configuration component 302, an interactive voice system component 304, a WWAN device configuration component 306 and a WWAN storage component 308. The default configuration component 302 provides preconfigured parameters on the WWAN device for the minimum initial communication between the WWAN device component 104 and the carrier server component 102. The communication path established by these parameters provides a bridge through the carrier server component 102 to the enterprise management server component 106.

In another aspect, the default configuration component 302 can retain a plurality of default configurations allowing the WWAN device component 104 to interact with a plurality of carrier server components or 102 different communication channels on a single carrier server component 102.

The interactive voice system component 304 provides the ability to interact with the carrier server component 102 and indirectly with the enterprise management server component 106 through spoken commands for initial communication, authentication and menu choice selection. The interactive voice system allows the user to provision a new WWAN device or reconfigure an existing WWAN device by answering questions presented by the voice system In another aspect, the interactive voice system component 304 can provide a voice learning capability so different dialects or accents do not defeat the usability of the interactive voice system. The interactive voice system component 304 can retain each of these different trained modes of communication and switch between them as directed by the user.

The WWAN device configuration component 306 provides the minimal configuration information for the WWAN device component 104 to communicate to the carrier server component 102. The WWAN device configuration component 306 allows the user to select from different configurations and provides the information necessary for forwarding to the enterprise management server component 106 to identify the WWAN device component 104 and allow the enterprise management server component 106 to provision and manage the WWAN device component 104.

The WWAN storage component 308 provides persistent storage for the plurality of configurations associated with the WWAN device component 104 with respect to communicating to different carrier server components 102 having different default communication parameters. The WWAN storage component 308 can also store the detailed communication configuration provided by the enterprise management server component 106 after the WWAN device component 104 becomes managed by the enterprise management component 106. The WWAN storage component 308 can store audit information associated with the selections made by the user in provisioning or configuring the WWAN device component 104 and this information can be requested by the enterprise management server component 106 at a subsequent time for generating reports or validating access to the managed system.

Figure 4:
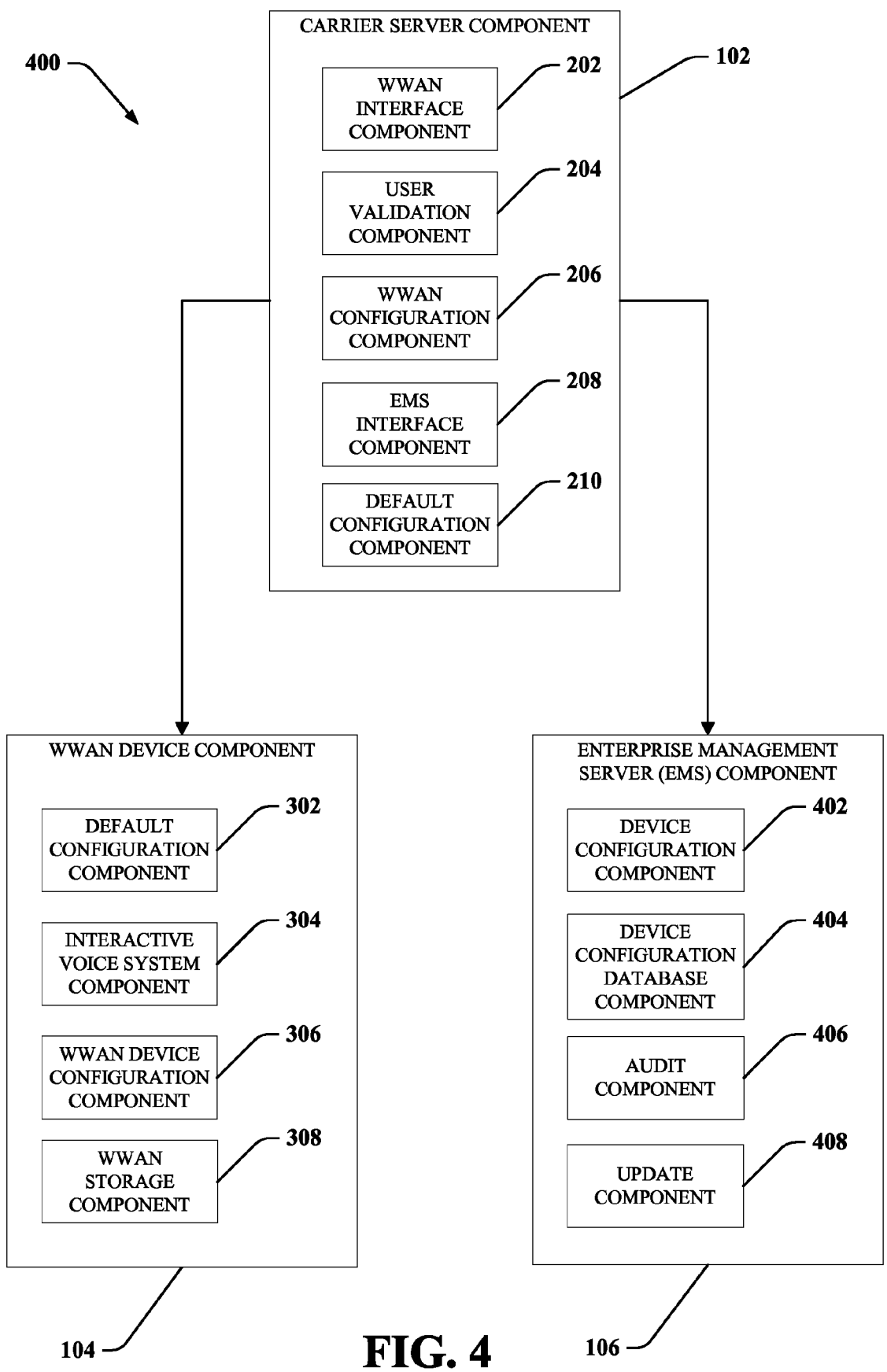
FIG. 4 illustrates an embodiment of an interactive WWAN management system and the associated enterprise management server components.

FIG. 4 depicts an enterprise management server component 106 comprising a device configuration component 402, a device configuration database component 404, an audit component 406 and an update component 408. It should be noted that the device configuration component 402 on the enterprise management server component 106 and the WWAN device configuration component 306 on the WWAN device component 104 perform similar functions. The WWAN device configuration component 306 performs these operations only on the WWAN device component 104 while the device configuration component 402 performs the same operations on the enterprise management server component 106. For example, the device configuration component 402 provides the detailed configuration parameters associated with the WWAN device component 104 requesting provisioning or configuration.

The device configuration database component 404 provides the ability to archive detailed configurations for the device types associated with management by the enterprise management server component 106. The device configuration database component 404 does not provide configuration information specific to a particular WWAN device, such as the device serial number but contains configuration information for any WWAN device associated with the WWAN device class.

In another aspect, the device configuration component 404 can provide additional information concerning the type of applications and there version numbers intended for configuration on the WWAN device. This information is similarly categorized by device class but can provide further segregations based on the capabilities of the individual WWAN device as reported by the WWAN device component 104.

For example, a particular WWAN device component 104 may report during provisioning an amount of memory in the WWAN device insufficient to support a particular version of a browser application. The device configuration database component 404 then incorporates this information into the database and downloads the appropriate version of the browser when the WWAN device request configuration of applications associated with the WWAN device type.

The audit component 406 provides the ability to maintain a trail of provisioning and configuration of the WWAN device component 104. This information is used to validate that the WWAN device component has entered a managed state by the enterprise management server component 106 and that proper application download has occurred. The audit component 406 can be interrogated for this information for producing reports of WWAN devices currently under management and the configuration of the devices. The audit component 406 can also maintain information of changes to the WWAN device component 104 made by the user locally at the WWAN device and if required, prepare a notice that a re-configuration of the WWAN device is necessary to place the WWAN device in its proper operating state.

The update component 408 maintains update information associated with the applications and system software currently installed on the WWAN device component 104. When new versions of applications are released, the update component 408 makes notations in the device configuration database component 404 and the updates are delivered to the WWAN device component 104 on a schedule determined by the configuration of the specific device type. In another aspect, the update component 408 can instruct the device configuration database component 404 to revert to a previous version of a particular application or remove a particular application from the WWAN device component 104.

Figure 5:
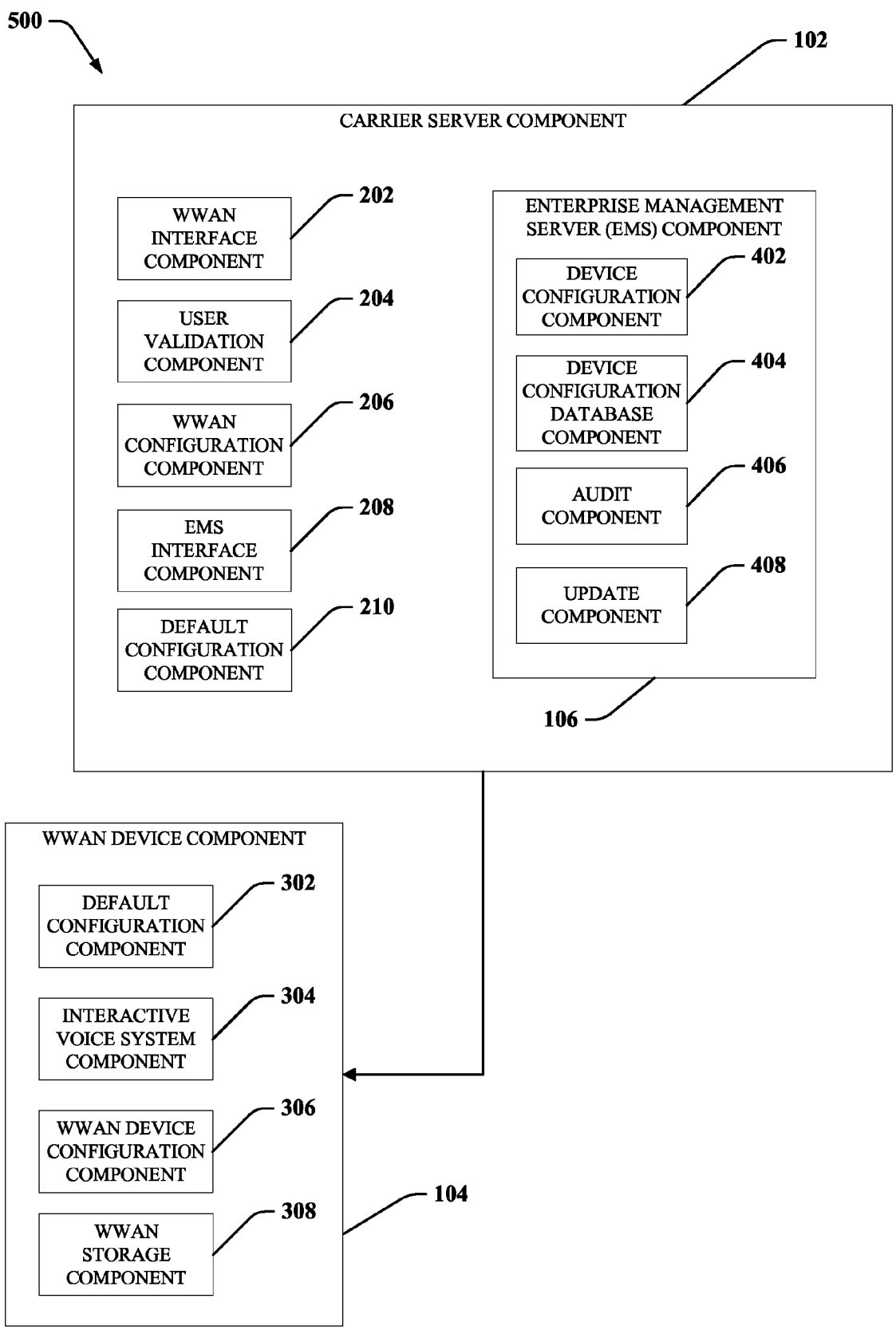
FIG. 5 illustrates an embodiment of an interactive WWAN management system with the associated enterprise management system implemented on the carrier server.

Referring now to FIG. 5, the carrier server component 102 illustrates that the enterprise management server component 106 and the carrier server component 102 can reside on the same computer although this is not a requirement. Further, multiple carrier server components 102 can exist on a network and interact with each other to distribute the load of supporting a large number of WWAN device components 104. Multiple carrier server components 102 can also function in a redundant capacity providing for failover support of the WWAN devices of a failed carrier server component 102 by another carrier component 102.

Figure 6:
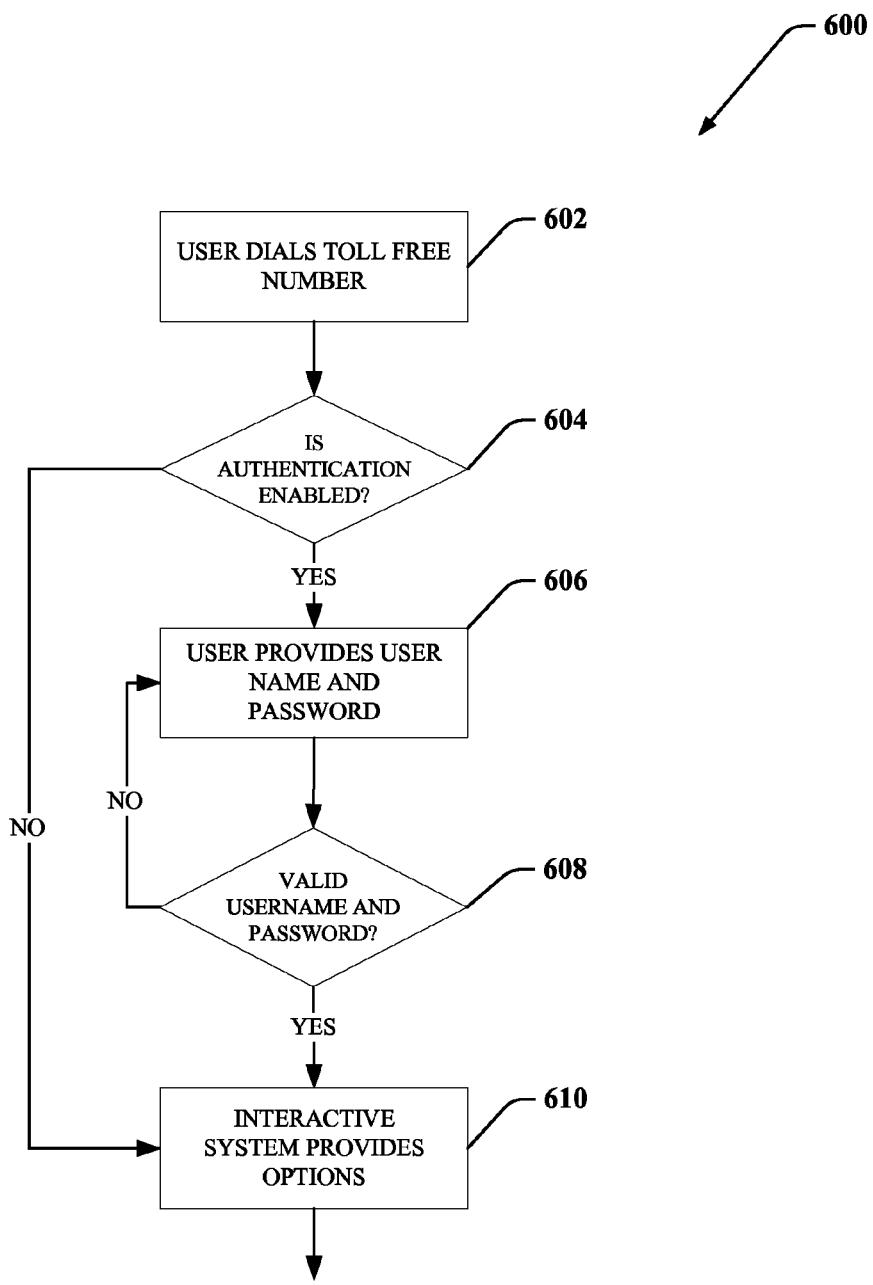
FIG. 6 illustrates an embodiment of a method of a mobile device initiating and interactive session with a carrier server.

Looking to figure FIG. 6, illustrated is a method of provisioning or configuring a WWAN device on a network. Beginning at step 602, the user dials a toll free number dedicated to provisioning or configuring WWAN devices. Based on the default minimal communication configurations, the WWAN device component 104 establishes a communication link with the carrier server component. At step 604, the method determines if the carrier server component 102 has authentication enabled. The carrier server can enable authentication for all communications, for communications with a particular device type or with a particular communication link such as a particular toll free telephone number. If carrier server component 102 enables authentication then the method proceeds to step 606.

Next, at step 606, the carrier server component 102 queries the user for a username and a password. After the user provides the username and password, the method proceeds to step 608 where the username and password are validated. If the user entered an invalid username and/or password then the method returns to step 606 and again requests a username and password. The carrier server component 102 can limit the number of times this interaction occurs with the WWAN device type or connection link. If the user enters a valid password then the method proceeds to step 610.

At step 610, the carrier server component 102 invokes the interactive configuration system and presents the user with the menu of configuration choices associated with the WWAN device. The user can select an method of interaction with the menu system such as but not limited to keypad interaction or voice system interaction. In another aspect, the user can change from one type of interaction to another based on the circumstances at the time of provisioning or configuration. For example, the user initially selected a voice interaction but since the user's selection, the ambient noise has risen to a level prohibiting the use of a voice system and the user switches to a keypad interaction. In another aspect the user can select a combination interaction where the user can either select the menu option on the keypad or speak the menu option for each option presented to the user.

Figure 7:
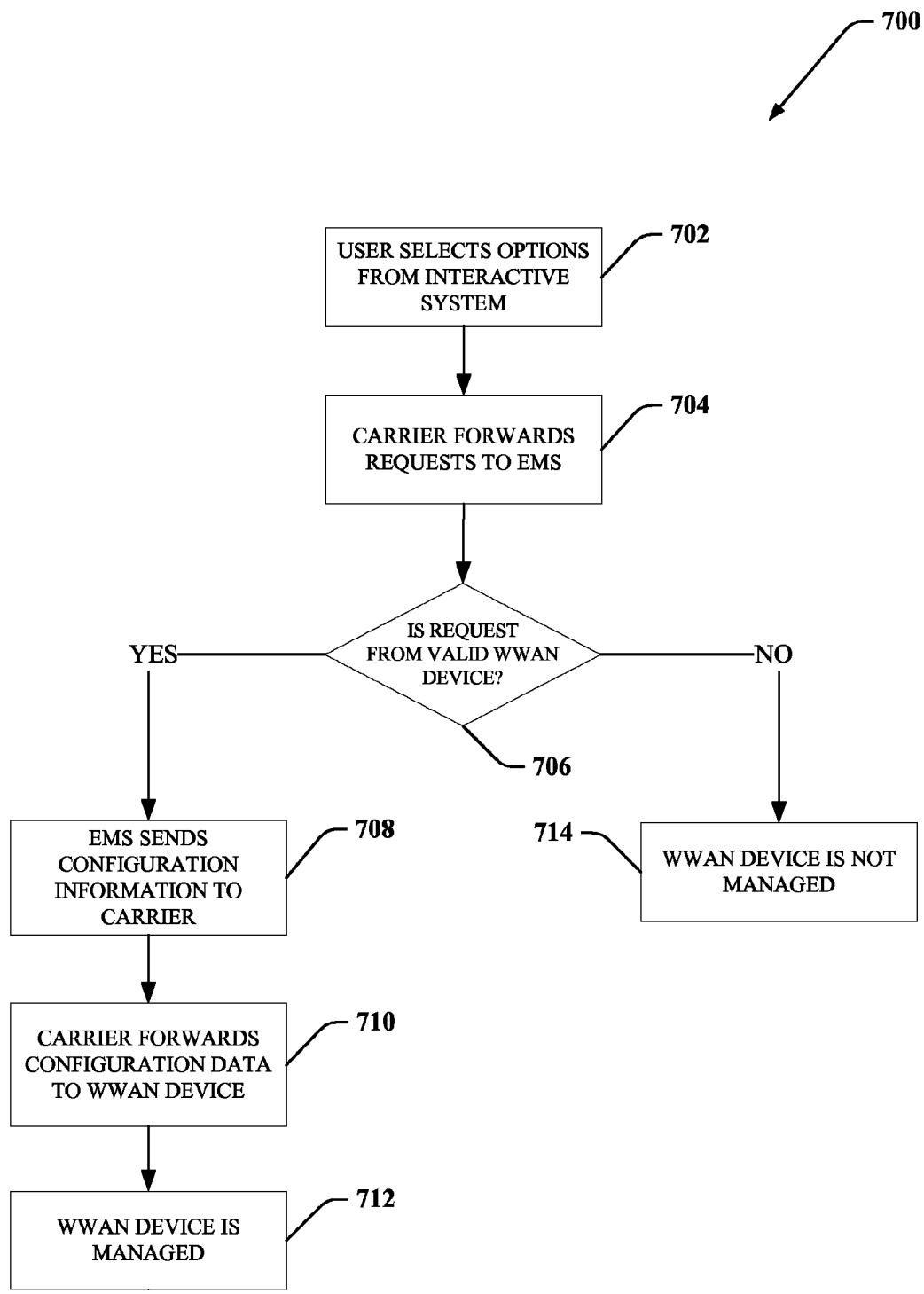
FIG. 7 illustrates an embodiment of a method of a mobile device selecting options from the interactive system and configuring the mobile device.

Referring now to FIG. 7, illustrated is a method for allowing a carrier server 102 to act as a bridge between a WWAN device component 104 and an enterprise management server component 106. Beginning at step 702, the user selects a provisioning or configuration option from the interactive menu system. Next at step 704 the carrier server component 102 forwards the user selection to the enterprise management server component 106. The request includes information allowing the enterprise management server component 106 to uniquely identify the WWAN device component 104. For example, the information can include the serial number of the device. The request also includes detailed information required to manage the device, the carrier server component combines this information with the information in the device configuration database 404 and after validating the WWAN device component serial number, configures the WWAN device for management.

Next at step 706, the enterprise management server component 106 determines if the request for management is from a valid device. As specified previously, the enterprise management server component 106 receives information uniquely identifying the WWAN device and looks up the identifying information in the device configuration database 404. If the enterprise management server component 106 determines the device requesting management is not a valid device then management by the enterprise management server component 106 is refused. If the enterprise management server component 106 determines the device requesting management is a valid device, then the method proceeds to step 708.

At step 708, the method continues with the enterprise management server component 106 sending the detailed configuration information to the carrier server component 102. The sent information is based on the identity of the WWAN device component 104 and allows the device access to the managed communication network. Next at step 710, the carrier server component 102 forwards the WWAN device configuration information to the WWAN device. The carrier server component 102 can send the WWAN device configuration information by any number of standard communication protocols. For example, the carrier server component 102 can send the WWAN device configuration information by the SMTP protocol. Next at step 712, the WWAN device receives the WWAN device configuration information and configures itself for management by the enterprise management server component 106 on the managed network.

Figure 8:
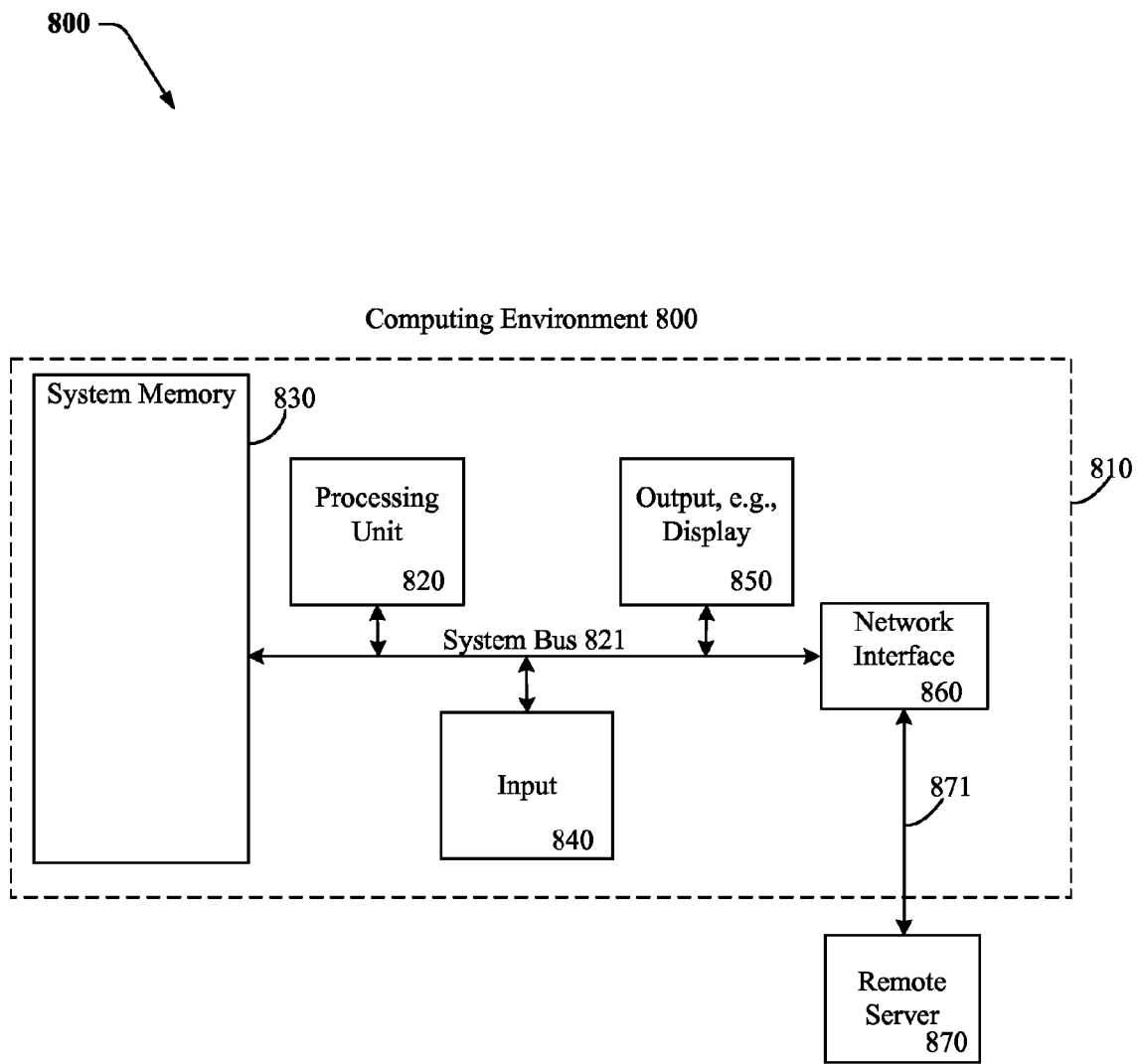
FIG. 8 illustrates a block diagram of an exemplary, non-limiting operating environment in which various aspects described herein can function.

FIG. 8 illustrates an example of a suitable computing system environment 800 implementing the claimed subject matter. Although as made clear above, the computing system environment 800 is only one example of a suitable computing environment for a mobile device and is not intended to suggest any limitation as to the scope of use or functionality of the claimed subject matter. Further, the computing environment 800 is not intended to suggest any dependency or requirement relating to the claimed subject matter and any one or combination of components illustrated in the example operating environment 800.

With reference to FIG. 8, an example of a remote device for implementing various aspects described herein includes a general purpose computing device in the form of a computer 810. Components of computer 810 can include, but are not limited to, a processing unit 820, a system memory 830, and a system bus 821 that couples various system components including the system memory to the processing unit 820. The system bus 821 can be any of several types of bus structures including a memory bus or memory controller, a peripheral bus, and a local bus using any of a variety of bus architectures.

Computer 810 can include a variety of computer readable media. Computer readable media can be any available media accessible by computer 810. By way of example, and not limitation, computer readable media can comprise computer storage media. Computer storage media includes volatile and nonvolatile as well as removable and non-removable media implemented in any method or technology for storage of information such as computer readable instructions, data structures, program modules or other data.

Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 810.

Communication media can embody computer readable instructions, data structures, program modules or other data in a modulated data signal such as a carrier wave or other transport mechanism and can include any suitable information delivery media.

The system memory 830 can include computer storage media in the form of volatile and/or nonvolatile memory such as read only memory (ROM) and/or random access memory (RAM). A basic input/output system (BIOS), containing the basic routines that help to transfer information between elements within computer 810, such as during start-up, can be stored in memory 830. Memory 830 can also contain data and/or program modules that are immediately accessible to and/or presently being operated on by processing unit 820. By way of non-limiting example, memory 830 can also include an operating system, application programs, other program modules, and program data.

The computer 810 can also include other removable/non-removable, volatile/nonvolatile computer storage media. For example, computer 810 can include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive can be connected to the system bus 821 through a non-removable memory interface such as an interface, and a magnetic disk drive or optical disk drive can be connected to the system bus 821 by a removable memory interface, such as an interface.

A user can enter commands and information into the computer 810 through input devices such as a keyboard or a pointing device such as a mouse, trackball, touch pad, and/or other pointing device. Other input devices can include a microphone, joystick, game pad, satellite dish, scanner, or the like. These and/or other input devices can be connected to the processing unit 820 through user input 840 and associated interface(s) that are coupled to the system bus 821, but can be connected by other interface and bus structures, such as a parallel port, game port or a universal serial bus (USB). A graphics subsystem can also be connected to the system bus 821. In addition, a monitor or other type of display device can be connected to the system bus 821 via an interface, such as output interface 850, which can in turn communicate with video memory. In addition to a monitor, computers can also include other peripheral output devices, such as speakers and/or a printer, which can also be connected through output interface 850.

The computer 810 can operate in a networked or distributed environment using logical connections to one or more other remote computers, such as remote server 870, which can in turn have media capabilities different from device 810. The remote server 870 can be a personal computer, a server, a router, a network PC, a peer device or other common network node, and/or any other remote media consumption or transmission device, and can include any or all of the elements described above relative to the computer 810. The logical connections depicted in FIG. 8 include a network 871, such local area network (LAN) or a wide area network (WAN), but can also include other networks/buses. Such networking environments are commonplace in homes, offices, enterprise-wide computer networks, intranets and the Internet.

When used in a LAN networking environment, the computer 810 connects to the LAN 871 through a network interface or adapter. When used in a WAN networking environment, the computer 810 can include a communications component, such as a modem, or other means for establishing communications over the WAN, such as the Internet. A communications component, such as a modem, which can be internal or external, connects to the system bus 821 via the user input interface at input 840 and/or other appropriate mechanism. In a networked environment, program modules depicted relative to the computer 810, or portions thereof, can be stored in a remote memory storage device. It should be appreciated that the network connections shown and described are exemplary and other means of establishing a communications link between the computers can be used.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and that any one or more middle layers, such as a management layer, can be provided to communicatively couple to such sub-components in order to provide integrated functionality. Any components described herein may also interact with one or more other components not specifically described herein but generally known by those of skill in the art.

In view of the exemplary systems described supra, methodologies that can be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, can be implemented which achieve the same or a similar result. Moreover, not all illustrated blocks are required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, no single embodiment shall be considered limiting, but rather the various embodiments and their equivalents should be construed consistently with the breadth, spirit and scope in accordance with the appended claims.

What is claimed is:

1. A system for provisioning and configuring a WWAN communication device, the system comprising:
    a carrier server component for providing initial communications between the WWAN communication device and an enterprise management server, wherein the carrier server component acts as a bridge between the WWAN communication device and the enterprise management server until the WWAN device is configured and managed by the enterprise management server;
    a WWAN communication device component for initiating communications with the carrier server component and selecting provisioning or configuration options at the WWAN communication device;
    an enterprise management server component for communicating with the carrier server component and determining detailed configuration information for WWAN communication device management, wherein the detailed configuration information is received by the WWAN device component from the enterprise management server component through the carrier server component and further wherein the WWAN device component configures itself using the received configuration information for management by the enterprise management server component.

2. The system of claim 1, the carrier server component requires the WWAN communication device component to provide a username and a password before presenting an interactive configuration system.

3. The system of claim 1, the user operates an interactive configuration system at the WWAN communication device by selecting menu options with a keypad.

4. The system of claim 1, the user operates an interactive configuration system at the WWAN communication device by speaking menu options to a voice system.

5. The system of claim 4, the user can switch between the voice activated menu selection system and a keypad entry system as desired.

6. The system of claim 1, the carrier server component comprises a plurality of default configurations for communicating with different standard protocols.

7. The system of claim 6, the standard protocol is an SMTP protocol.

8. The system of claim 6, the standard protocol is an SMPP protocol.

9. The system of claim 1, enterprise management server component further comprises an audit component for tracking and reporting WWAN communication device provisioning and configuration based on a carrier server component bridge.

10. A method for automatically provisioning or configuring a WWAN communication device using an initial standard protocol and known communication parameters, the method comprising:
    establishing a connection between a WWAN communication device and a carrier server;
    presenting an interactive system from the carrier server to a user on the WWAN communication device;

selecting provisioning or configuration options at the WWAN communication device;

forwarding configuration request to an enterprise management server in response to selecting provisioning or configuration options;

validating the requesting WWAN communication device based on the identity of the WWAN communication device;

sending detailed configuration information from the enterprise management server through the carrier server to the WWAN communication device, wherein the WWAN communication device configures itself using the received detailed configuration information; and managing the WWAN communication device by the enterprise management server.

11. The method of claim 10, the user dials a toll free telephone number dedicated to provisioning and configuration to establish the connection between the WWAN communication device and the carrier server.

12. The method of claim 10, the carrier server requires entry of a valid username and password before providing the interactive provisioning and configuration system to the user.

13. The method of claim 10, the user selects provisioning or configuration options from the WWAN communication device keypad.

14. The method of claim 10, the user selects provisioning or configuration options from the WWAN communication device using a voice system.

15. The method of claim 14, the user selects provisioning or configuration options from the WWAN communication device using a combination of the voice system and entries on the WWAN communication device keypad.

16. The method of claim 10, further comprising: updating applications installed on the WWAN communication device.

* * * * *